(12) United States Patent
Grabau et al.

(10) Patent No.: US 6,322,437 B1
(45) Date of Patent: Nov. 27, 2001

(54) METHOD FOR STRIPPING THE MUSCLE MEAT FROM FISH AND DEVICE FOR CARRYING OUT THIS METHOD

(75) Inventors: Thomas Grabau; Rainer Brocksch; Stefan Giesler; Sabine Löw, all of Lübeck; Ulrich Gütte, Bad Oldesloe, all of (DE)

(73) Assignee: Nordischer Maschinenbau Rud. Baader GmbH + CO KG, Lubeck (DE)

( * ) Notice: Subject to any disclaimer, the term of this patent is extended or adjusted under 35 U.S.C. 154(b) by 0 days.

(21) Appl. No.: 09/529,556

(22) PCT Filed: Oct. 2, 1998

(86) PCT No.: PCT/EP98/06251

§ 371 Date: Jun. 26, 2000

§ 102(e) Date: Jun. 26, 2000

(87) PCT Pub. No.: WO99/20115

PCT Pub. Date: Apr. 29, 1999

(30) Foreign Application Priority Data

Oct. 17, 1997 (DE) .............................................. 197 45 891
Aug. 1, 1998 (DE) .............................................. 198 36 179

(51) Int. Cl.⁷ .................................................. A22C 25/16
(52) U.S. Cl. ......................... 452/161; 452/162; 452/135
(58) Field of Search .................... 452/162, 161, 452/135, 151

(56) References Cited

U.S. PATENT DOCUMENTS

| | | | |
|---|---|---|---|
| 4,336,634 | * | 6/1982 | Braeger ................................. 452/162 |
| 4,748,723 | * | 6/1988 | Braeger et al. ....................... 452/162 |
| 5,106,335 | * | 4/1992 | Behnk et al. ......................... 452/162 |
| 5,149,297 | * | 9/1992 | Braeger et al. ....................... 452/162 |
| 5,520,576 | * | 5/1996 | Wastell et al. ....................... 452/162 |
| 5,871,395 | * | 2/1999 | Grabau et al. ....................... 452/162 |

FOREIGN PATENT DOCUMENTS

| | | |
|---|---|---|
| 943612 | 5/1956 | (DE) . |
| 14 54 087 | 2/1969 | (DE) . |
| 711502 | 5/1996 | (EP) . |
| 322360 | 12/1929 | (GB) . |
| 2185381 | 7/1987 | (GB) . |
| WO8806844 | 9/1988 | (WO) . |

* cited by examiner

Primary Examiner—Willis Little
(74) Attorney, Agent, or Firm—Mattingly, Stanger & Malur, P.C.

(57) ABSTRACT

A method for obtaining muscle flesh from beheaded fish by severing muscle flesh from dorsal and/or ventral spokes together with fins and fin holders as well as from ribs or lateral vertebral appendages and a vertebral column. The method uses an apparatus having severing means for severing the muscle flesh from the dorsal and/or ventral spokes which include a first tool and a second tool, each of which is provided with pairs of cutting means. The cutting means of the first tool and the associated bone guides can be controlled in height with respect to the position of their cutting edges and guide edges, respectively, relative to a conveying path. The cutting means of the second tool are constructed as knife blades arranged between the bone guides with the cutting edges pointing towards the conveying path. The knife blades are elastically displaceable away from the conveying path. The method includes the steps of providing the fish for severing of the muscle flesh from the spokes with incisions running along the row of fins and on both sides of the fin holders and essentially extending into the region of the tips of the spokes and severing of the muscle flesh from the spokes which is affected following on from the incisions adjacent to the fin holders.

10 Claims, 8 Drawing Sheets

METHOD FOR STRIPPING THE MUSCLE MEAT FROM FISH AND DEVICE FOR CARRYING OUT THIS METHOD

The invention concerns a method for obtaining the muscle flesh from beheaded fish by severing the muscle flesh from the dorsal and/or ventral spokes (processes dorsalis et ventralis) together with the fins and fin holders as well as from the ribs or lateral vertebral appendages and the vertebral column, and an apparatus for carrying out the method, including a conveyor which conveys the fish along a conveying path, severing means for severing the muscle flesh from the dorsal and/or ventral spokes and fin holders, the ribs and the vertebral column, bone guides associated with the severing means and running in the severing planes thereof with guide edges pointing towards the conveying path, measuring means for detecting an individual fish size and computer means for generating control signals.

Such methods are in many variants the basis of fillet production.

Such a method can be found for example in DE-C-1 454 087 which shows a typical tool sequence and arrangement for the corresponding processing of fish. In this example the fish trunk to be processed is supported by means of a push saddle in its ventral cavity and pushed with the tail in front towards pairs of dorsal and ventral knives which cut the fillets free from the dorsal and ventral spokes and then towards a pair of flank knives which are set in a roof shape relative to each other and whose cutting edges are moved into the cutting position at the moment of passage of the end of the ventral cavity and cut the fillets free from the ribs. A pair of severing knives finally ensure complete detachment of the fillets from the flanks of the vertebral column in the tail region of the fish trunk, while the latter is guided by engagement in the dorsal and ventral incisions. The size of mutual spacing of the dorsal and ventral knives to be provided is here determined by the anatomical conditions of the type of fish and fish size being processed, usually on the basis of the greatest thickness of dorsal and ventral spokes to be found in the vicinity of the vertebral column, this being the spokes in the vicinity of the head and of the end of the ventral cavity, respectively. As a result of these conditions, severing of the fillets from the dorsal and ventral spokes is effected leaving a strip of flesh on the skeleton, which comprises the aforementioned spokes and the dorsal and ventral fins together with the cartilaginous matter located at their base, so that a considerable portion of valuable muscle flesh is lost as fillet flesh.

In the endeavour to reduce this loss, according to a practised state of the art the corresponding tools of a machine which conveys the fish with the tail in front were provided with knives which exhibit axial resiliency directed towards each other and are provided with an inner chamfer. The basic distance between the knives is here set such that after initial cutting, under the effect of the inner chamfers, displacement of the knives is effected by the dorsal and ventral spokes, respectively, which become increasingly thicker in the direction of cutting. The yield obtained is based on the resulting adaptation of the thickness of the strip of flesh containing the dorsal and ventral spokes to the respective thickness thereof in the vicinity of the vertebral column. With this arrangement of the knives it turns out that at the same time also the flanks of the aforementioned fin holders are visible or palpable essentially in the cut face, so that with severing cuts of plane configuration a further yield is not obtainable.

The invention for the purpose of further increasing the yield makes use of the fact that the dorsal and ventral spokes and also the fin holders taper to a point in the region of their ends pointing towards each other, so that in conventional filleting there is still fillet flesh left between the locations of the fin holders defining the knives' distance, and the dorsal and ventral spokes, respectively.

It is the object of the invention to provide a filleting method which, starting from conventional filleting technology, allows the yield of high-value fillet flesh to be improved decisively.

This object is achieved according to the invention by the fact that the fish for severing the muscle flesh from the spokes is initially provided with incisions running along the row of fins and on both sides of the fin holders and essentially extending into the region of the tips of the spokes, and that then severing of the muscle flesh from the spokes is effected following on from the incisions adjacent to the fin holders.

An apparatus of the kind described hereinbefore which is suitable for carrying out this method is characterised in that the severing means for cutting the muscle flesh free from the dorsal and/or ventral spokes include a first and a second tool, each of which are provided with pairs of cutting means, wherein the cutting means of the first tool and the associated bone guides can be controlled in height with respect to the position of their cutting edges and guide edges, respectively, relative to the conveying path, and wherein the cutting means of the second tool are constructed as knife blades arranged between the bone guides with cutting edges pointing towards the conveying path and are resiliently displaceable away from the conveying path.

The advantages of the method according to the invention lie in particular in that cutting free of the fin holders is effected with individual adaptation of the cutting means to their thickness and flank structure and in that similarly the free cut of the dorsal and/or ventral spokes, which completes the filleting cut, can be guided directly along their flanks.

Severing of the muscle flesh in the manner according to the invention provides optimum flesh yield during corresponding processing in the region of the dorsal and ventral spokes. Here the necessary technical means for the two processing regions are essentially identical, so that the statements below on processing of the dorsal spokes can always also be applied to processing of the ventral spokes.

Preferred features of embodiment can be found in the subsidiary claims. Here the spring-resilient displacement capacity of the knife blades causes a kind of scraping cut which is oriented by the flanks of the spokes, and so ensures that the latter are scraped free with optimum yield.

Further, due to the possibility of independent control of the first tool and the bone guides, the position of the guide edges relative to the depth of incision of the first tool can be influenced. In this way, it can be achieved as is necessary for processing according to the invention, that on the one hand the tail region can be guided reliably (guide edges and knife cutting edges at one level) and that on the other hand unforced guiding in the remaining region is made possible (guide edges set back from knife cutting edges).

For reliable operation of the first tool, which also has the function of severing the tough skin, it has proved optimal if its cutting means are constructed as driven circular knives which are controllable with respect to the mutual distance between their effective cutting edges. Here, in distance control of the circular knives, altering their mutual angular position yields the possibility of adaptation to the thickness and shape of the fin holders, which vary over the length of the fish, so that cutting with optimum yield is ensured. Further optimisation of the result can also be achieved by the fact that the circular knives are resiliently displaceable in the direction of increasing the distance between them.

Finally the use of stepping motors to produce the control movements in connection with computer means allows universal and exactly reproducible control of the individual working means.

In addition to the advantages set forth above, employing the method according to the invention decreases the risk that irregularities on the skeleton such as growing together occurrences, damages and the like will cause bone portions to be split off and remain in the fillet. This method therefore is adhered to the added advantage that the time requirements for wage-intensive and personnel-intensive quality control and correction are reduced.

The apparatus according to the invention is described in more detail below with the aid of a practical example shown in the drawings. There is shown in.

Figure 1:
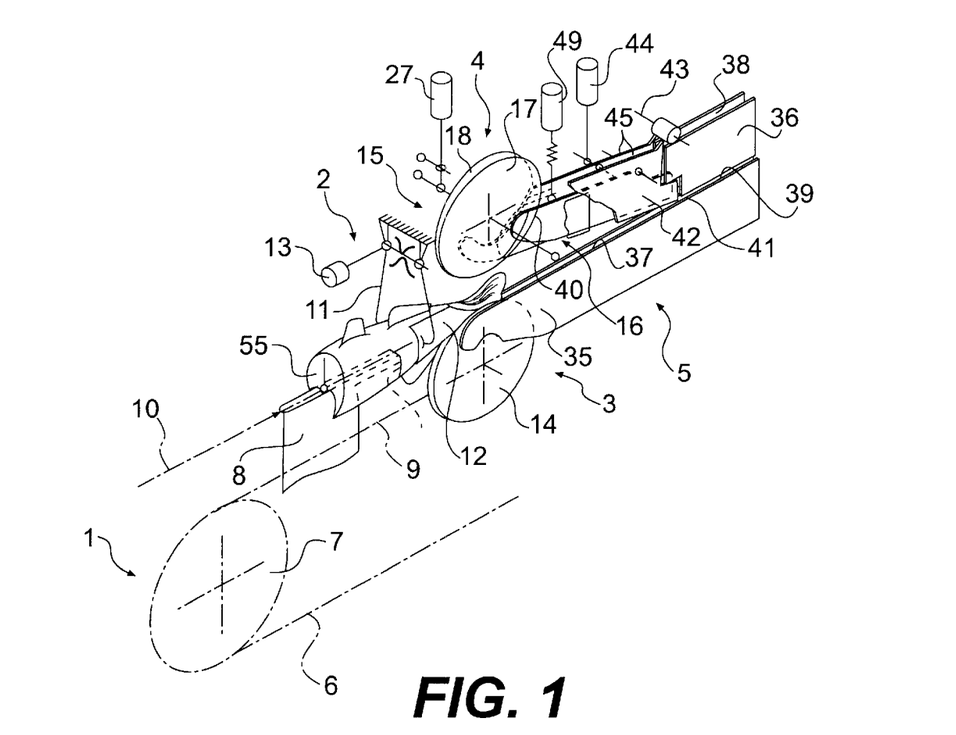
FIG. 1 a perspective simplified partial view of a filleting machine in the region of the tools for cutting free the dorsal and ventral spokes, FIG. 2 a "glass" fish to illustrate the anatomical details, FIG. 3 a detail side view of the machine according to FIG. 2, FIG. 4 a cross-sectional view of the tool for cutting free the dorsal spokes with a fish being processed shown in half-section, where the right view shows processing of the tail region at the level of the section line I—I according to FIG. 2 and the left view shows processing of the region containing the ventral cavity at the level of the section line II—II according to FIG. 2, FIG. 5 an enlarged detail plan view of the view according to FIG. 3, FIG. 6 a cross-section through the fish along the section plane II in FIG. 2, FIG. 7 a cross-section through the fish along the section line I in FIG. 2, and FIG. 8 a block diagram for control of the machine, FIG. 9 a plan view of the input region, FIG. 10 a schematic view of different-sized fish in the region of the accumulating and input rollers shown in FIG. 9, FIG. 11 a side view to show the input region from FIG. 9, FIG. 12 a plan view of the apparatus for severing the remaining connections between flesh and bones in the tail region, FIG. 13 a rear view of the view from FIG. 12, FIG. 14 a schematic view of the cutting countersupport from FIG. 13 at the moment of passage of the holding saddle, FIG. 15 a schematic view according to FIG. 14 without the holding saddle.

As can be seen in particular from FIG. 1, the apparatus according to the invention for obtaining the muscle flesh of fish includes a conveyor 1 for conveying the fish to be processed, a measuring device 2 for detecting specific fish data, a severing device 3 for severing the muscle flesh from the ventral spokes 59, a severing device 4 for severing the muscle flesh from the dorsal spokes 58 and means 5 for guiding the fish 55.

The components described above are arranged in a machine frame not shown in more detail. The conveyor 1 is constructed as an endless chain conveyor 6 which is guided around two deflection wheels, only one of which is shown with reference number 7, and is equipped with holding saddles 8 for holding the fish in their ventral cavity 56 and conveying them with the tail 57 in front. The conveyor 1 with its upper run 9 follows a linear conveying path 10.

The measuring device 2 is arranged above the conveying path 10 and comprises a pair of feeler arms 11 with feeler blocks 12 synchronised in opposite directions and in inverse symmetry adjacent to the conveying path, for detecting the thickness of the fish. Associated with the feeler arms 11 is a sensor in the form of an angle encoder 13 which records a lateral displacement movement.

The severing device 3 includes a pair of circular knives 14 for cutting free the ventral spokes 59 and for severing the muscle flesh in the dorsal region a first tool 15 for cutting free the dorsal fin holders 60 as well as a second tool 16 for stripping the muscle flesh from the dorsal spokes 58.

Figure 4:
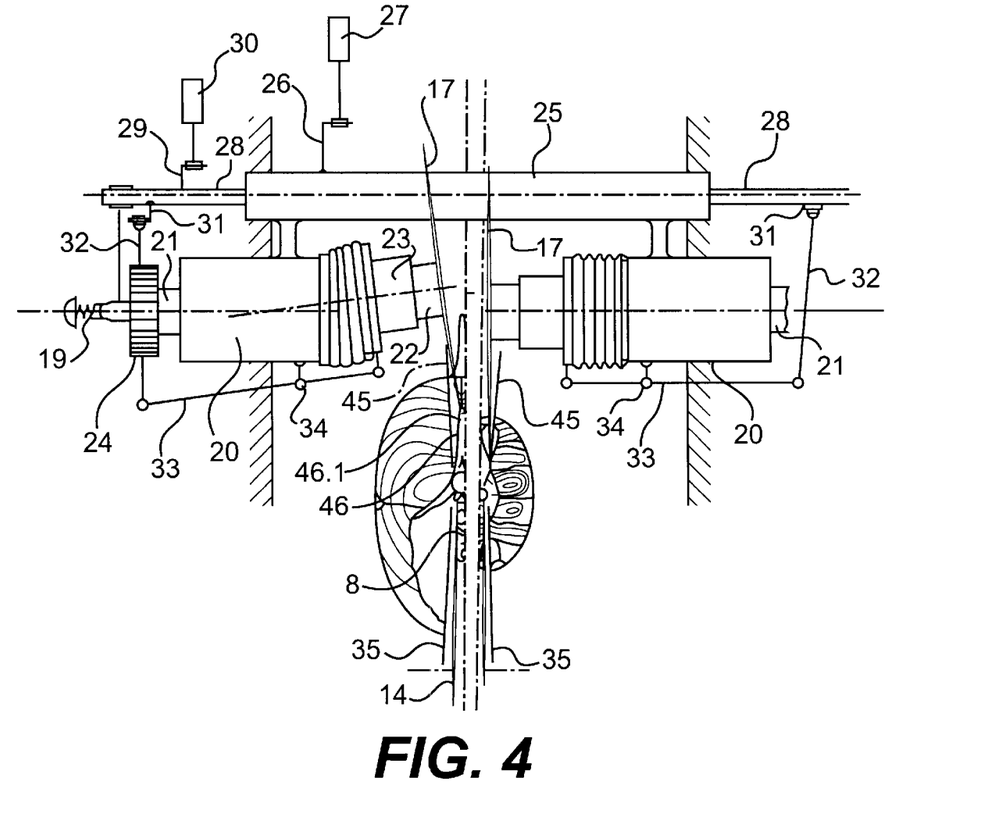

The first tool 15 comprises a pair of circular knives 17 which are arranged concentrically to each other and forming a gap 18 symmetrical to the conveying path 10. The circular knives 17 are controllable according to FIG. 4, this being with respect to a variation in the distance from their effective cutting edges and the conveying path 10 as well as their angular position relative to each other. Furthermore they are resiliently displaceable axially outwards, as shown with the spring 19. For this purpose each circular knife 17 is fixed to a drive shaft 21 which is mounted in a bearing housing 20 and whose front portion 22 is mounted in a deflectable housing portion 23 and connected by a spring coupling, not shown, to the portion of the drive shaft 21 on the drive side, to which is fixed a toothed belt pulley 24 for driving the circular knives 17. The bearing housings 20 are connected to each other by means of a hollow shaft 25 which is mounted rotatably in the machine frame. Attached to the hollow shaft 25 is a crank lever 26 which is engaged by a setting element 27. In the hollow shaft 25 is mounted a shaft 28 which is also provided with a crank lever 29 which is engaged by a setting element 30. On the shaft 28 are arranged two further crank levers 31 each of which is connected by a link 32 to a free end of a two-armed lever 33. The lever 33 is pivotable about a bearing 34 mounted on the bearing housing 20 and its other free end is mounted on the housing portion 23.

Figure 3:
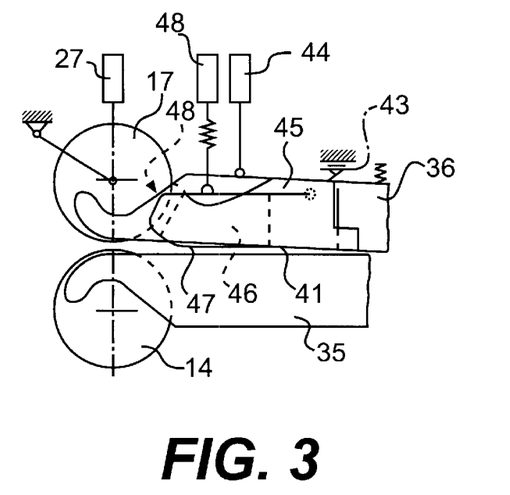

Adjoining the circular knives 14 for cutting free the ventral spokes and those 17 for severing the muscle flesh in the dorsal region are, as can be seen in FIGS. 1 and 3, the means 5 for guiding the fish in the form of pairs of bone guides 35 or 36 arranged in the cutting planes of the circular knives 14 and 17, respectively, which bone guides 35 and 36 are arranged below or above the conveying path 10 and form a gap 37 for guiding the ventral spokes 59 and a gap 38 for guiding the dorsal spokes 58, respectively. Further, the bone guides 35 and 36 are provided with guide edges 39 and 40, respectively, which form between the bone guides a lateral gap 41 for guiding the ribs 61 or lateral vertebral appendages.

Figure 5:
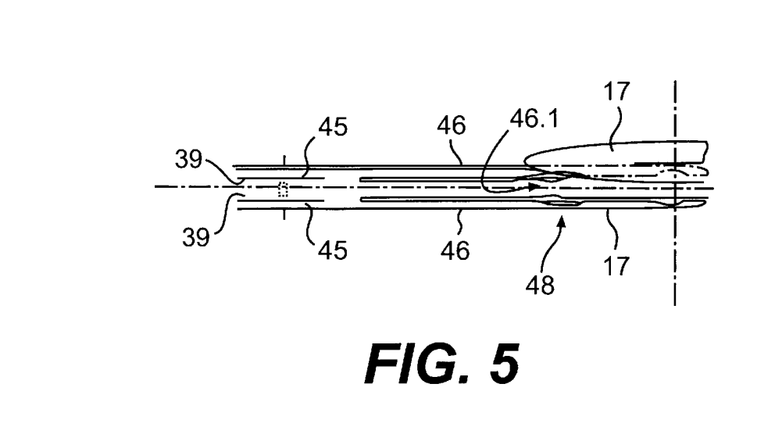
Figure 6:
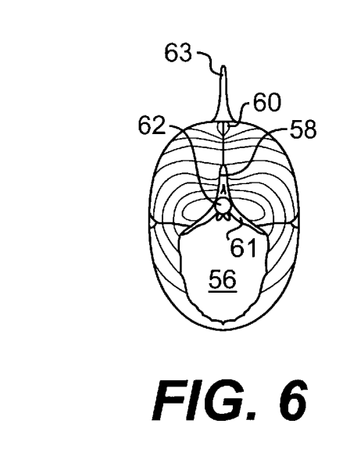
Figure 7:
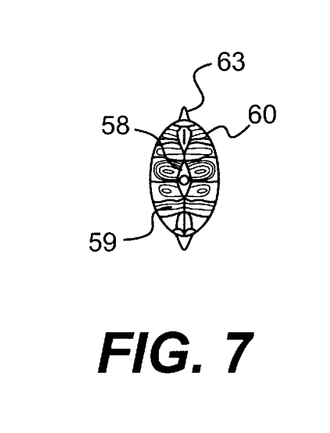

The bone guides 36 operative in the dorsal region comprise a front section 42 which is linked so as to be pivotable about an axis 43 and which is controllable by means of a setting element 44 in the direction of influencing the input size of the gap 41 and consists of a pair of bone guides 45. Between the bone guides 45 is arranged the second tool 16 for stripping the muscle flesh from the dorsal spokes 58. It consists, as can best be seen from FIGS. 1, 3 and 5, of a pair of knife blades 46 made of spring steel sheet and provided with cutting edges 47 which point towards the conveying path 10 and which run like skids in the direction opposite the direction of conveying. The knife blades 46 are splayed at their front ends directed towards the circular knives 17 and extend therewith into a gap between the outer flanks of the circular knives 17 and the inner flanks of the bone guides 45. The knife blades 46 are coupled at their rear end to the bone guides 45 and controllable by means of a setting or adjusting element 49 in such a way that the cutting edges 47 are displaceable between a position in which they extend into the gap 41 and a position in which they are retracted behind the guide edges 40.

Figure 8:
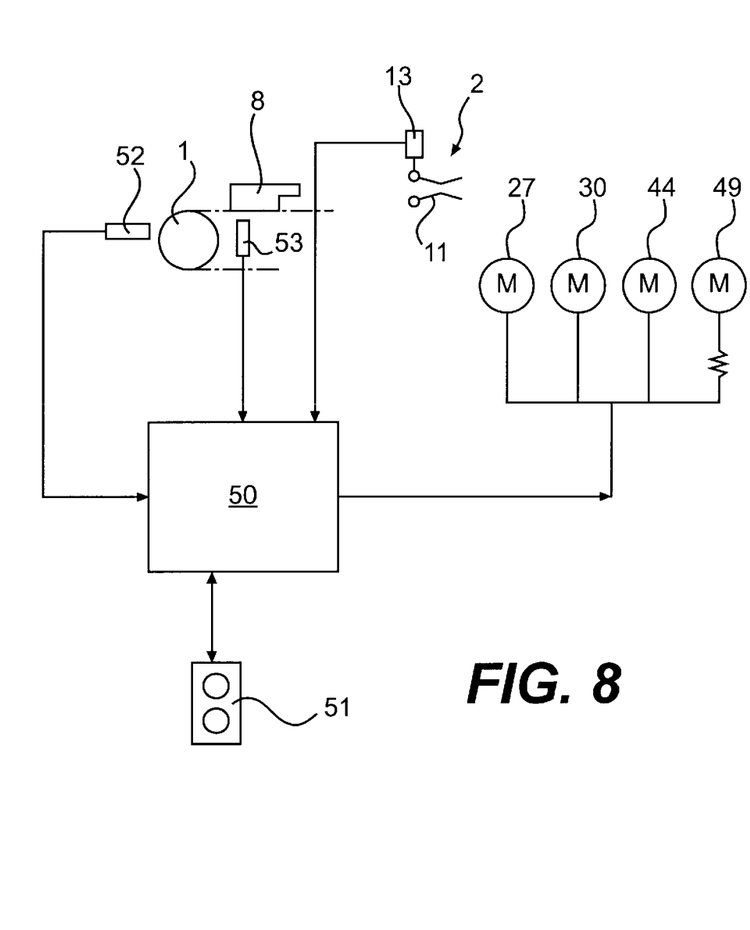

The manner of operation of the apparatus according to the invention is the following. Control of the apparatus is effected, according to FIG. 8, by a central control unit 50 which can be activated by an on-off switch 51. The control unit 50 is synchronised by a clock generator 52 corresponding to the conveyor 1 and by an initiator 53 which monitors the position of the holding saddle 8. Control of the control unit 50 is further effected by the measuring device 2 which detects the course of the thickness by passing between the feeler arms 11 and outputs corresponding signals to the control unit 50. From the signals the control unit derives a suitable programme for the setting or adjusting elements 27, 30, 44, 49 which are constructed as stepping motors.

Figure 2:
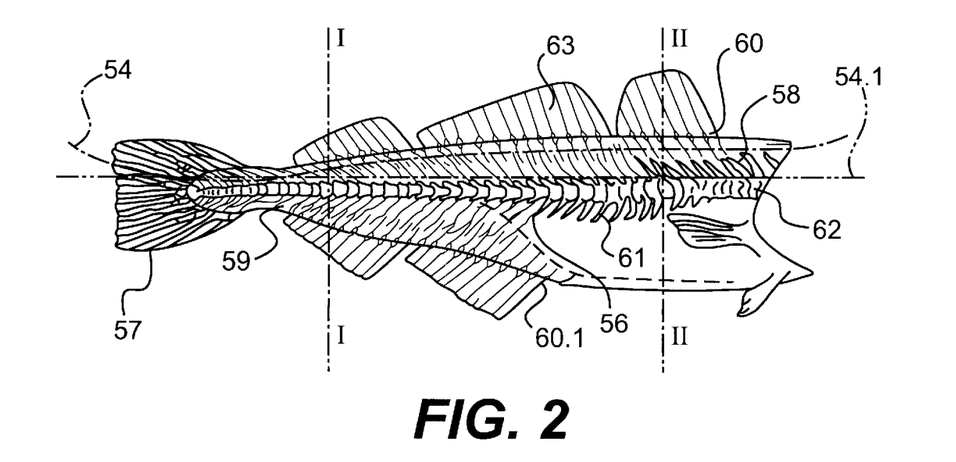

A headed and gutted fish 55 with opened ventral cavity 56 straddles with the latter a holding saddle 8 which approaches by means of the conveyor 1, in such a way that its tail 57 points in the direction of movement of the conveyor 1. After alignment by aligning means, not shown, the fish passes into the region of the measuring device which records the course of its thickness and its length. By the control unit 50 the corresponding signals are processed and from them is derived a control programme for control of the setting elements 27, 30, 44, 49. Here, the control programme for processing the dorsal region provides that the circular knives 17 of the first tool 15 are lowered by means of the setting element 27 and the bone guides 45 by means of the setting element 44, when the tail end of the fish has reached the working region of the circular knives 17. After cutting the muscle flesh free from some of the dorsal spokes 58, the circular knives 17 are gradually driven out of their position with up to then an essentially parallel gap (see FIG. 4, right-hand side) into a mutual angular position which causes an enlargement of the gap 18 in the upper region of the circular knives 17. At the same time the height of the circular knives 17 is varied by means of the setting element 27 in such a way that their effective cutting edges follow the cutting depth line 54 shown in dot and dash lines in FIG. 2, i.e. cutting free of the muscle flesh is effected only in the region of the fin holders 60 (see FIG. 4, left-hand side). After initial cutting, the bone guides 45 are lifted with the circular knives 17, this being in such a way that the effective cutting edges of the circular knives 17 project beyond the guide edges 40 and ensure optimum guiding of the skeleton. In this way the second tool 16 comes into action with its knife blades 46 which are resiliently displaceable upwards by means of the setting element 49 and progressively strip the muscle flesh from the flanks of the dorsal spokes 58, wherein the stripping cuts follow the free cuts in the region of the fin holders 60 and the cutter knives 46 with their cutting edges 47 follow the groove line 54.1 formed between the spokes 58 and the vertebral column 62.

Detachment of the muscle flesh in the region of the ventral fin holders and spokes 59 can be effected in the same way or in the traditional way, the latter also applying to processing of the ventral cavity region and cutting the muscle flesh free at the flanks of the vertebral column 62.

In a fish transfer-centring device, for supply of the apparatus the fish 100, in particular the slaughtered fish with no head, is laid manually by hand in the conveyor belt 101 arranged in a V shape. In an alternative embodiment the fish are supplied by a machine arranged upstream, e.g. from the troughed belt of the Baader 434 machine.

Figure 9:
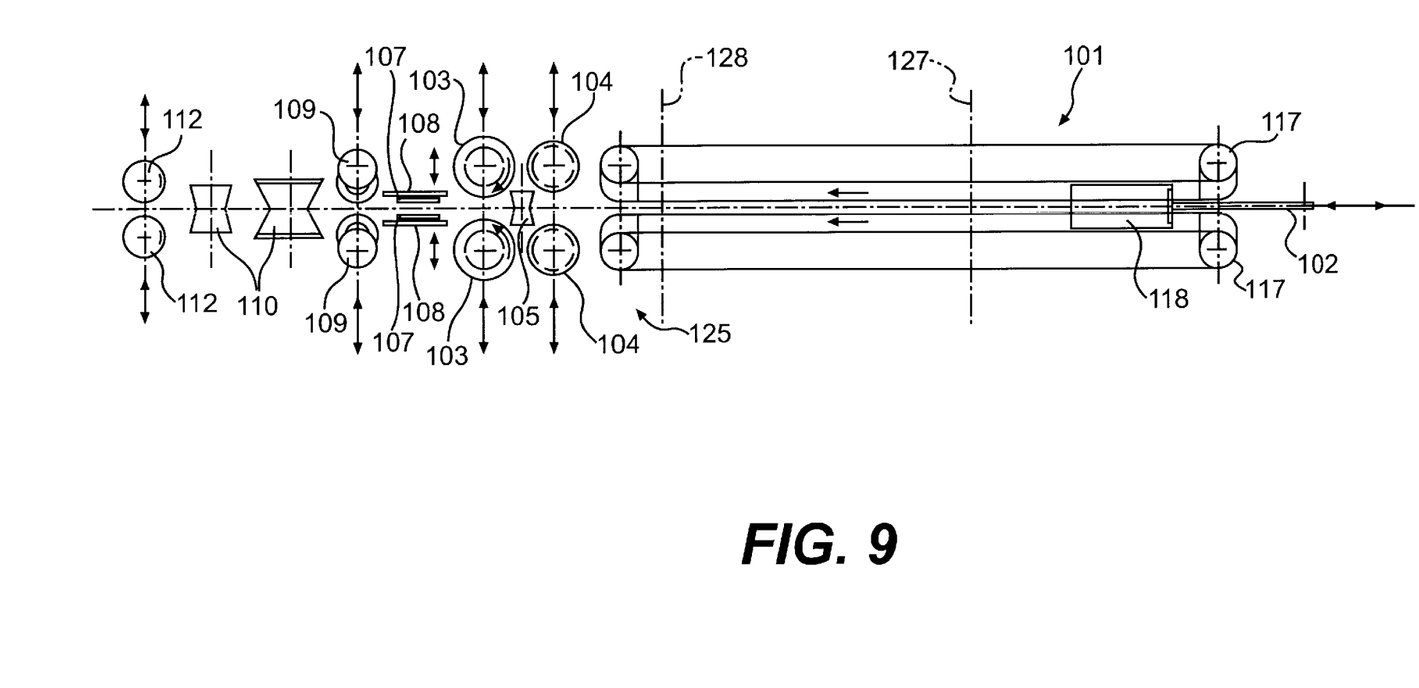
Figure 10A:
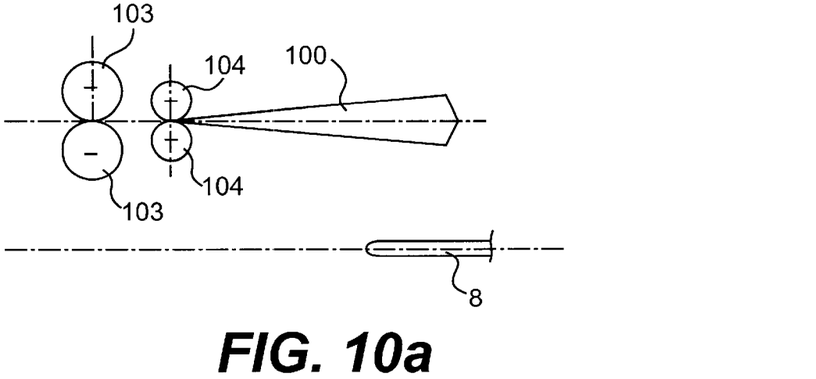
Figure 10B:
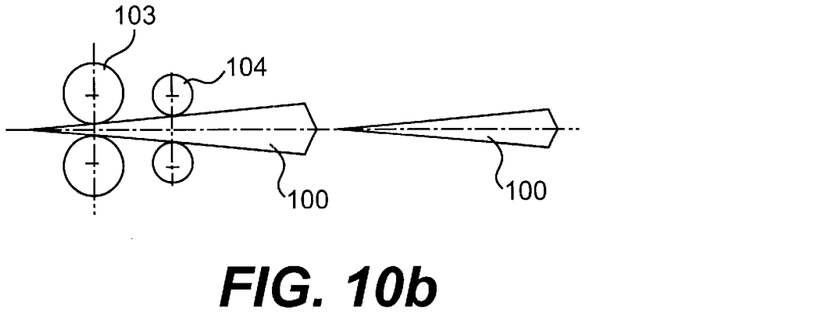
Figure 10C:
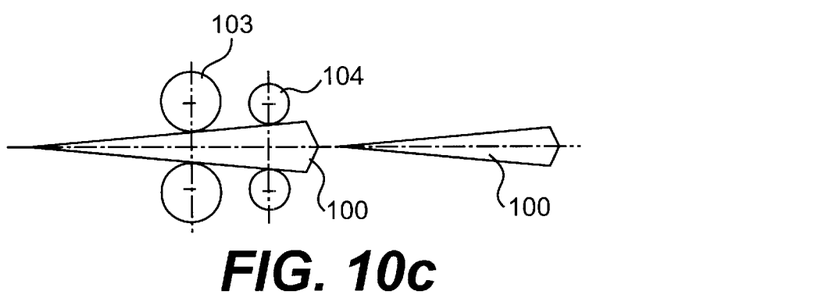
Figure 10D:
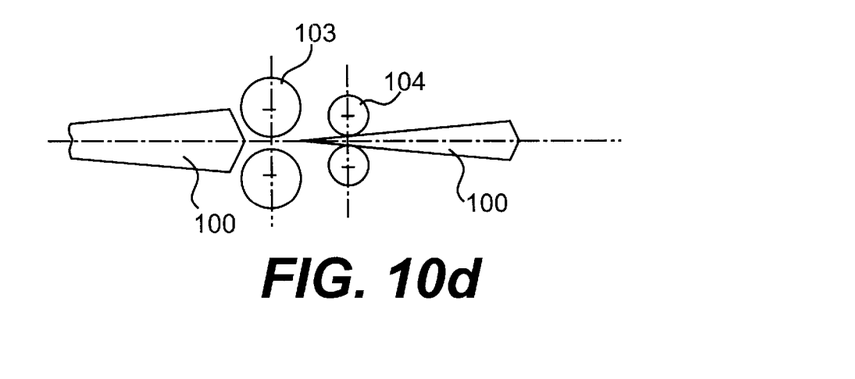
Figure 11:
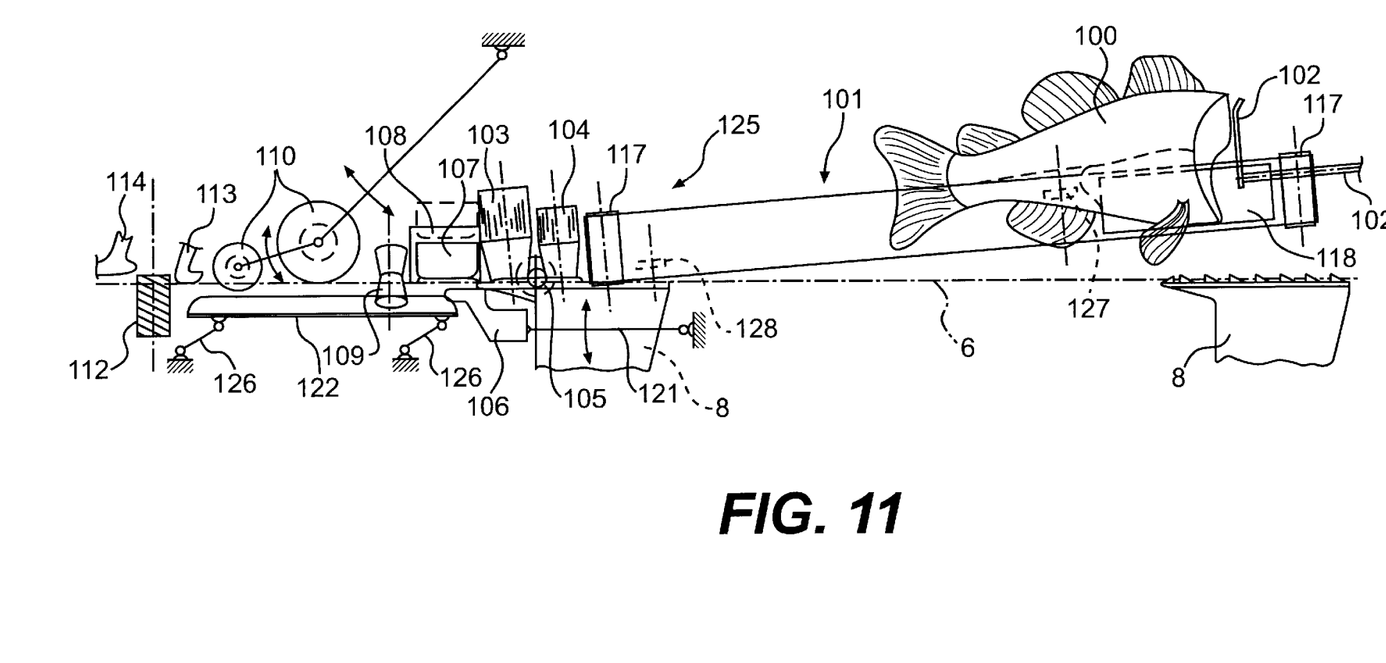

In the input region of the conveyor belt 101 which is arranged in a V shape, as can be seen in FIGS. 10 and 11, the fish or fish trunk 100 passes initially into a fish holding trough 118 which is suitable for holding fish and from which the fish is pushed into the direct input region of the conveyor belt 101 by means of the slide 102 working in the direction of conveying of the V-shaped conveyor belt 101. In the region of the fish holding trough 118, which is shown from above in FIG. 9, is located a first length measuring device 127 which in the embodiment shown consists of an optoelectronic device. This length measuring device 127, which can be seen in FIG. 9 or FIG. 11, signals to the control unit 50 when the fish 100 has passed the length measuring device by means of conveyor belt 101. Shortly before the deflection rollers of the conveyor belt 101 is located a second length measuring device 128 which delivers both a signal for the arriving tail of the fish 100 and a signal for the head or collarbone end of the fish to the control unit 50.

In the process the slide 102 moves in dependency of the speed of the V-shaped conveyor belt 101 in such a way that the slide speed is lower than or equal to the conveyor belt speed, to avoid upstreaming of the fish 100. The slide 102 is driven by a gear mechanism in such a way that it can be directed into the fish holding trough 118 depending on the holding saddles 8 which rotate on an endless chain conveyor 6, as can be seen in FIGS. 9 and 11, so that due to the forward movement of the slide 102 the fish passes out of the trough 118 into the input region of the conveyor belt 101 which moves it in the direction of the input rollers 103. As can be seen in FIG. 10a, the tail of the fish 100 first runs up against the accumulating rollers 104 which are closed to passage of the fish. At this location the fish 100 must now remain until the holding saddle 8 passes into the straddling region 125 of the apparatus, which can be seen in FIG. 9 or FIG. 11. In FIGS. 10a, 10b, 10c and 10d, which can be seen in FIG. 10, it is shown schematically how the different-sized fish 100 are conveyed through the accumulating rollers 104 and the input rollers 103. The belly roller 105 shown in FIGS. 9 and 11 supports the fish from its underside before it is picked up by the straddling aid 106 which is movable in a vertical direction. Essentially at the moment when the holding saddle 8 reaches the saddle guide in the straddling region 125 and slides through it, the straddling aid 106 is lifted and penetrates into the ventral cavity of the fish 100, in order then to deposit the latter on the holding saddle 8 which continues to move forwards. This operation is assisted by the pushers 107 shown in FIG. 9 and FIG. 11, which are arranged to be essentially vertically displaceable, in connection with the brake flaps 108 which are arranged symmetrically to the longitudinal axis of the apparatus and are slidable essentially transversely to the direction of conveying. The centring rollers 109, which can be seen in FIG. 9 and FIG. 11, are laterally slidable by means of a pair of spring-loaded levers, so that they can adapt to different fish sizes. Above the so-called table 122, which depending on the length signals is located lower for large fish by means of the height adjusting device of the table guide 126 than for smaller fish, are located the pressure contact rollers 110, which are shown in FIGS. 9b and 11, which on the one hand prevent the fish 100 from falling off the holding saddle above the table, and on the other hand they centre the fish in such a way that it sits symmetrically on the holding saddle 8 for subsequent processing. The table 122 is divided in two and longitudinally partitioned, respectively, so that the holding saddle passes through the table 122 during its conveying movement. In the region in front of the circular knives 14 and 17 the essentially vertically arranged pivot centring rollers 112 are, depending on the respective fish size, movable transversely to the direction of conveying the fish 100 and by means of spring force designed in such a way that they centre the fish 100 relative to the longitudinal axis of conveying. Likewise in the region immediately in front of the circular knives 14 and 17 a first fin lifter 113 and a second fin lifter 114 are arranged in such a way that the fish 100 is passed under them so that any dorsal fins of the fish 100 adhering to the trunk are vertically lifted in order not to hinder the subsequent processing operation, particularly of the circular knives 17. In FIG. 11 is shown the holding saddle deflecting lever 121 which deflects the straddling aid 106 for straddling the fish 100 on the holding saddle 8. A drive motor, not shown, centrally drives the pressure contact rollers 110, the centring rollers 109, the belly roller 105, the accumulating rollers 104 and the input rollers 103 by means of revolving belts. The pivot centring rollers 112, the fin lifters 113 and 114, the table 122, the pressure contact rollers 110, the centring rollers 109, the brake flaps 108, the pushers 107, the straddling aid 106, the accumulating rollers 104 and the input rollers 103 are moved in a vertical and/or horizontal direction by means of at least one adjusting or setting element communicating with the respective element, wherein the adjusting elements obtain their adjusting signals from the control unit 50, wherein the adjusting signals are essentially influenced by the parameters of fish length or size and the position of the holding saddle 8, which are processed in the control unit 50.

In an alternative embodiment, control of the circular knives 14 and 17 from FIG. 1 is effected by means of the length measuring device 127 and the length measuring device 128, which can be seen in FIGS. 9 and 11, and which transmit their signals to the control unit 50. In the control unit 50, these signals are converted to control commands in an analogous manner to the description corresponding to FIGS. 1 to 7, wherein now a length signal in connection with the known morphological relationships supplies an indication of the corresponding fish size.

In a device 1200 for severing the residual connections between flesh and bones in the tail region, which is arranged in the direction of conveying after the tools shown in FIG. 1 for cutting the spokes free, the holding saddle 8 transports the fish 100 in a state in which the fish flesh has been essentially separated from the bones, up to the circular knives 1250 which have the function of cutting through the residual connections existing in the tail region of the fish 100 between flesh and skeleton. When these connections are cut through, the fish fillets fall on both sides of the symmetrically constructed device onto the endlessly revolving fillet conveyor belts 1260, from where they are transported away by the machine. In order that the severing cut of the knives 1250 can be particularly effective, the knives 1250 are arranged in such a way that they themselves can yield to a bone of the fish 100. This yielding movement of the knives 1250 is effected against a weak spring 1270 which acts on the knife drive shaft 1271 by means of lever 225 and joint 226 and support bearing 227. In order that this cut can take place effectively even with different-sized fish, the yielding movement of the knives 1250 is effected against a strong spring 1280 which is shown schematically in FIG. 12. In order that in cases of the yielding movement the whole drive unit 1300 of the knives 1250 can follow the latter, this drive unit is driven by means of a flexible shaft 210. The flexible shaft is driven by means of drive belts 1226 in connection with the drive pulleys 217, 216 and the drive motor 1225. As the holding saddle 8 as a rule is wider than the cutting zone in the tail region, the knives 1250 are designed in such a way that together with their drive unit 1330 they are pivotable upwards.

Figure 12:
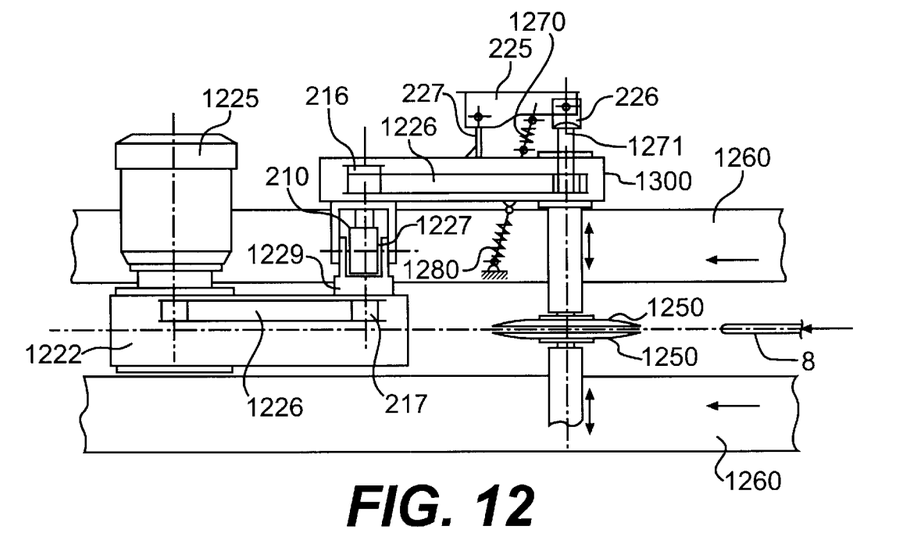
Figure 13:
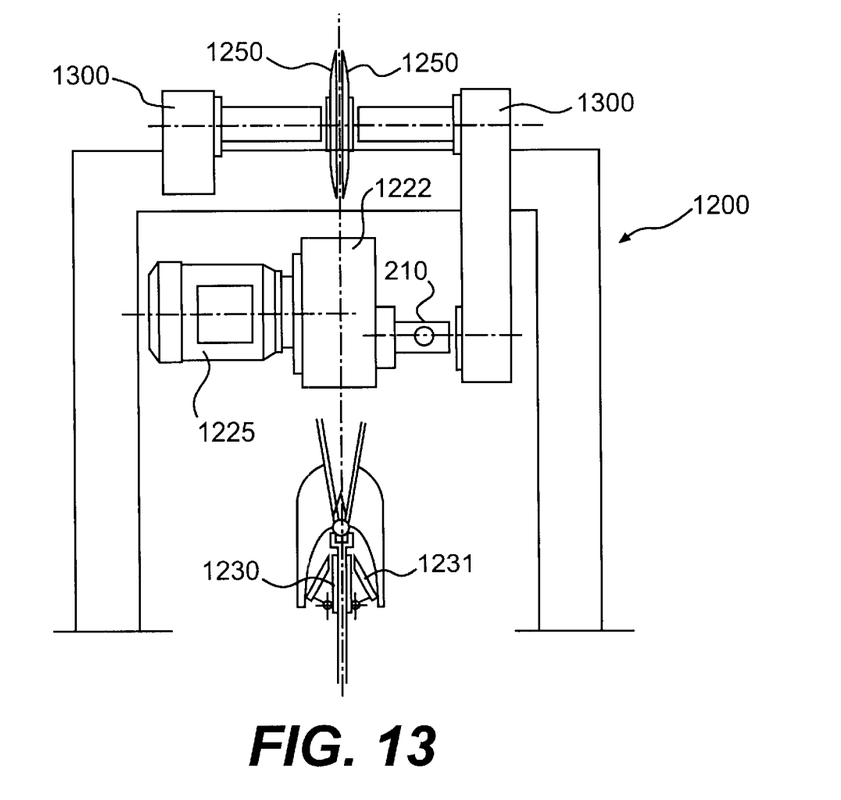
Figure 14:
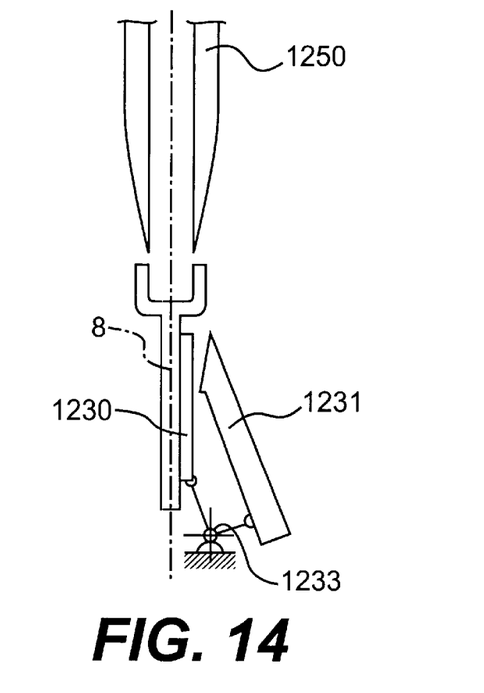
Figure 15:
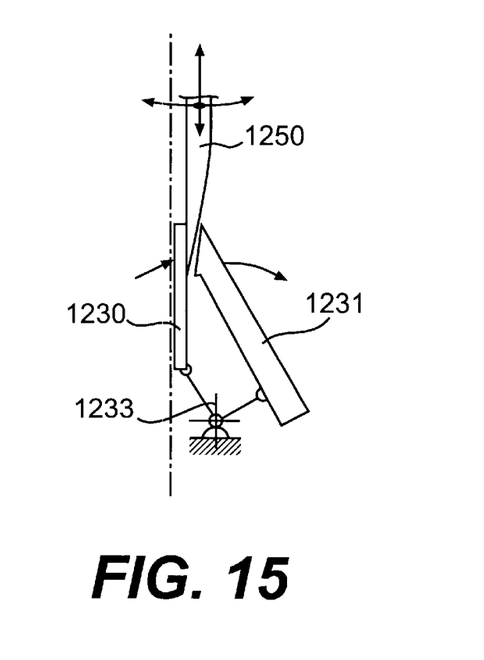

In FIG. 13 the device for severing the remaining connections between fish flesh and bones in the tail region is shown from the front. In this view the drive units 1300 of the knives 1250 are in the upper deflected position which they occupy when the holding saddle passes through their cutting region. The working unit 1300 is rotatable about the pivot point shown schematically in the flexible shaft 210 (FIGS. 12 and 13). In FIG. 14 it is shown how the knife 1250 is in its actual cutting position between inner cutting countersupport 1230 and outer cutting countersupport 1231, which are in turn arranged so as to be pivotable about the pivot point 1233. If the holding saddle 8 now passes through the cutting region from FIG. 14, as shown in FIG. 15, because the holding saddle 8 rotates on an endless chain conveyor 6, the knives 1250 are pivoted away upwards, wherein both the inner cutting countersupport 1230 and the outer cutting countersupport 1231 can yield to the holding saddle 8 about the pivot point 1233.

What is claimed is:

1. A method for obtaining muscle flesh from beheaded fish by severing muscle flesh from dorsal and/or ventral spokes together with fins and fin holders as well as from ribs or lateral vertebral appendages and a vertebral column, using apparatus comprising severing means for severing the muscle flesh from the dorsal and/or ventral spokes which include a first tool and a second tool, each of which is provided with pairs of cutting means and wherein the cutting means of the first tool and the associated bone guides can be controlled in height with respect to the position of their cutting edges and guide edges, respectively, relative to a conveying path, and wherein the cutting means of the second tool are constructed as knife blades arranged between the bone guides with cutting edges pointing towards the conveying path and are elastically displaceable away from the conveying path; the method comprising the steps of:

providing the fish for severing of the muscle flesh from the spokes with incisions running along the row of fins and on both sides of the fin holders and essentially extending into the region of the tips of the spokes, and severing of the muscle flesh from the spokes which is effected following on from the incisions adjacent to the fin holders.

2. An apparatus for carrying out a method of obtaining the muscle meat from beheaded fish by severing muscle flesh from dorsal and/or ventral spokes together with fins and fin holders as well as from ribs or lateral vertebral appendages and a vertebral column wherein the fish for severing of the muscle flesh from the spokes is initially provided with incisions running along a row of fins and on both sides of the fin holders and essentially extending into a region of tips of the spokes, and then severing of the muscle flesh from the spokes is effected following on from the incisions adjacent to the fin holders, the apparatus comprising a conveyor which conveys the fish along conveying path, severing means for severing the muscle flesh from the dorsal and/or ventral spokes and fin holders, the ribs and the vertebral column, bone guides associated with the severing means and running in severing planes thereof with guide edges pointing towards the conveying path, measuring means for detecting an individual fish size and computer means for generating control signals, and wherein the severing means for severing the muscle flesh from the dorsal and/or ventral spokes include a first tool and a second tool, each of which is provided with pairs of cutting means and wherein the cutting means of the first tool and the associated bone guides can be controlled in height with respect to the position of their cutting edges and guide edges, respectively, relative to the conveying path, and wherein the cutting means of the second tool are constructed as knife blades arranged between the bone guides with cutting edges pointing towards the conveying path and are elastically displaceable away from the conveying path.

3. An apparatus according to claim 2, wherein the knife blades of the second tool are resiliently displaceable with respect to their mutual distance, and the shape of their cutting edges is skid-like in a direction opposite the direction of conveying, and wherein the distance between the cutting edges has a narrow point in the region of their skid-like shape.

4. An apparatus according to claim 2, wherein the bone guides, at least in a region pointing in a direction opposite the direction of conveying, are adjustable in height with respect to the relative position of their guide edges in relation to the conveying path and independently of the first tool.

5. Apparatus according to claim 2, wherein the cutting means of the first tool are constructed as driven circular knives which are controllable with respect to a mutual distance between their effective cutting edges.

6. Apparatus according to claim 5, wherein the distance between the circular knives is controlled by varying their mutual angular position.

7. Apparatus according to claim 5, wherein the circular knives are elastically displaceable whereby the distance between them may be increased.

8. Apparatus according claim 2, wherein the control movements are produced by stepping motors according to measurement signals processed by the computer means.

9. Apparatus according to claim 2, wherein the conveyor is constructed as a push saddle conveyor which supports the fish in their ventral cavity and conveys them with the tail leading.

10. Apparatus for carrying out automatic processing of fish, by a method of obtaining muscle flesh from beheaded fish by severing muscle flesh from dorsal and/or ventral spokes together with fins and fin holders as well as from ribs or lateral vertebral appendages and a vertebral column, wherein the fish for severing of the muscle flesh from the spokes is initially provided with incisions running along a row of fins and on both sides of the fin holders and essentially extending into a region of tips of the spokes, and then severing of the muscle flesh from the spokes is effected following on from the incisions adjacent to the fin holders, the apparatus comprising at least one fish supply apparatus, at least one apparatus for obtaining muscle flesh from fish and an apparatus for severing the residual connections between flesh and bones in the tail region of fish.

* * * * *